(12) United States Patent
Neverovitch et al.

(10) Patent No.: US 12,073,109 B2
(45) Date of Patent: Aug. 27, 2024

(54) METHOD AND SYSTEM FOR LIBFABRIC ATOMICS-BASED LOCKLESS CLUSTER-WIDE SHARED MEMORY ACCESS API IN A DISTRIBUTED SYSTEM

(71) Applicant: Hewlett Packard Enterprise Development LP, Houston, TX (US)

(72) Inventors: Oleg Neverovitch, Hillsborough, NJ (US); Yann Livis, Bedminster, NJ (US); Dmitry L. Ivanov, Branchburg, NJ (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 262 days.

(21) Appl. No.: 17/362,587

(22) Filed: Jun. 29, 2021

(65) Prior Publication Data

US 2022/0413743 A1    Dec. 29, 2022

(51) Int. Cl.
*G06F 3/00* (2006.01)
*G06F 3/06* (2006.01)
*G06F 15/173* (2006.01)

(52) U.S. Cl.
CPC .......... *G06F 3/0655* (2013.01); *G06F 3/0604* (2013.01); *G06F 3/067* (2013.01);
(Continued)

(58) Field of Classification Search
CPC ...... G06F 3/0655; G06F 3/0604; G06F 3/067; G06F 15/17331; G05B 2219/36037
See application file for complete search history.

(56) References Cited

U.S. PATENT DOCUMENTS 9,658,879 B2    5/2017  Lv et al.
9,875,182 B1 *  1/2018  Wallace ............... G06F 12/023
(Continued)

FOREIGN PATENT DOCUMENTS

AU    2014278314 A1    1/2016

OTHER PUBLICATIONS

"Open MPI: Open Source High Performance Computing", available online at <https://web.archive.org/web/20200423044944/https://www.open-mpi.org/>, Apr. 23, 2020, 2 pages.
(Continued)

*Primary Examiner* — Reginald G Bragdon
*Assistant Examiner* — Michael L Westbrook
(74) *Attorney, Agent, or Firm* — Sheppard Mullin Richter & Hampton LLP

(57) ABSTRACT

The system allocates, in a distributed system comprising a plurality of nodes, a plurality of portions of memory which comprise shared remote memory content. The system registers the allocated portions with an operating system to be accessed via RDMA. The system accesses, by a first node, the allocated portions to obtain a local copy. The system performs an atomic operation on one or more bits of the shared remote memory content via libfabric atomic application programming interface calls, by one or more of: updating the one or more bits based on a new value and an offset; retrieving, from the shared remote memory content based on the offset, a current value of the one or more bits prior to the updating; and performing an action on the shared remote memory content based on a comparison of the retrieved current value with an expected value in the local copy.

19 Claims, 11 Drawing Sheets

(52) U.S. Cl.
CPC .............. *G05B 2219/36037* (2013.01); *G06F 15/17331* (2013.01)

(56) References Cited

U.S. PATENT DOCUMENTS

| | | | |
|---|---|---|---|
| 2015/0100749 A1* | 4/2015 | Koker .................... | G06F 9/3004 |
| | | | 711/169 |
| 2017/0187621 A1* | 6/2017 | Shalev .................. | H04L 45/745 |
| 2022/0114098 A1* | 4/2022 | Das Sharma .......... | G06F 9/526 |

OTHER PUBLICATIONS

Cerbo, David, "Everything I know about distributed locks", Medium, Oct. 15, 2019, 6 pages.

Github, "UnifyFS: A file system for burst buffers", available online at <https://web.archive.org/web/20201023133747/https://unifyfs.readthedocs.io/en/dev/>, Oct. 2, 2020, 2 pages.

Open Fabrics Interfaces Working Group, "Libfabric", available online at <https://web.archive.org/web/20190111215246/https://ofiwg.github.io/libfabric/>, Jan. 11, 2019, 3 pages.

OpenSHMEM, "Welcome to OpenSHMEM", available online at <https://web.archive.org/web/20200222012935/http://openshmem.org/site/>, Feb. 22, 2020, 1 page.

\* cited by examiner

METHOD AND SYSTEM FOR LIBFABRIC ATOMICS-BASED LOCKLESS CLUSTER-WIDE SHARED MEMORY ACCESS API IN A DISTRIBUTED SYSTEM

BACKGROUND

Field

This disclosure is generally related to the field of management. More specifically, this disclosure is related to a method and system for libfabric atomics-based lockless cluster-wide shared memory access API in a distributed system.

BRIEF DESCRIPTION OF THE FIGURES

In the figures, like reference numerals refer to the same figure elements.

DETAILED DESCRIPTION

Figure 1:
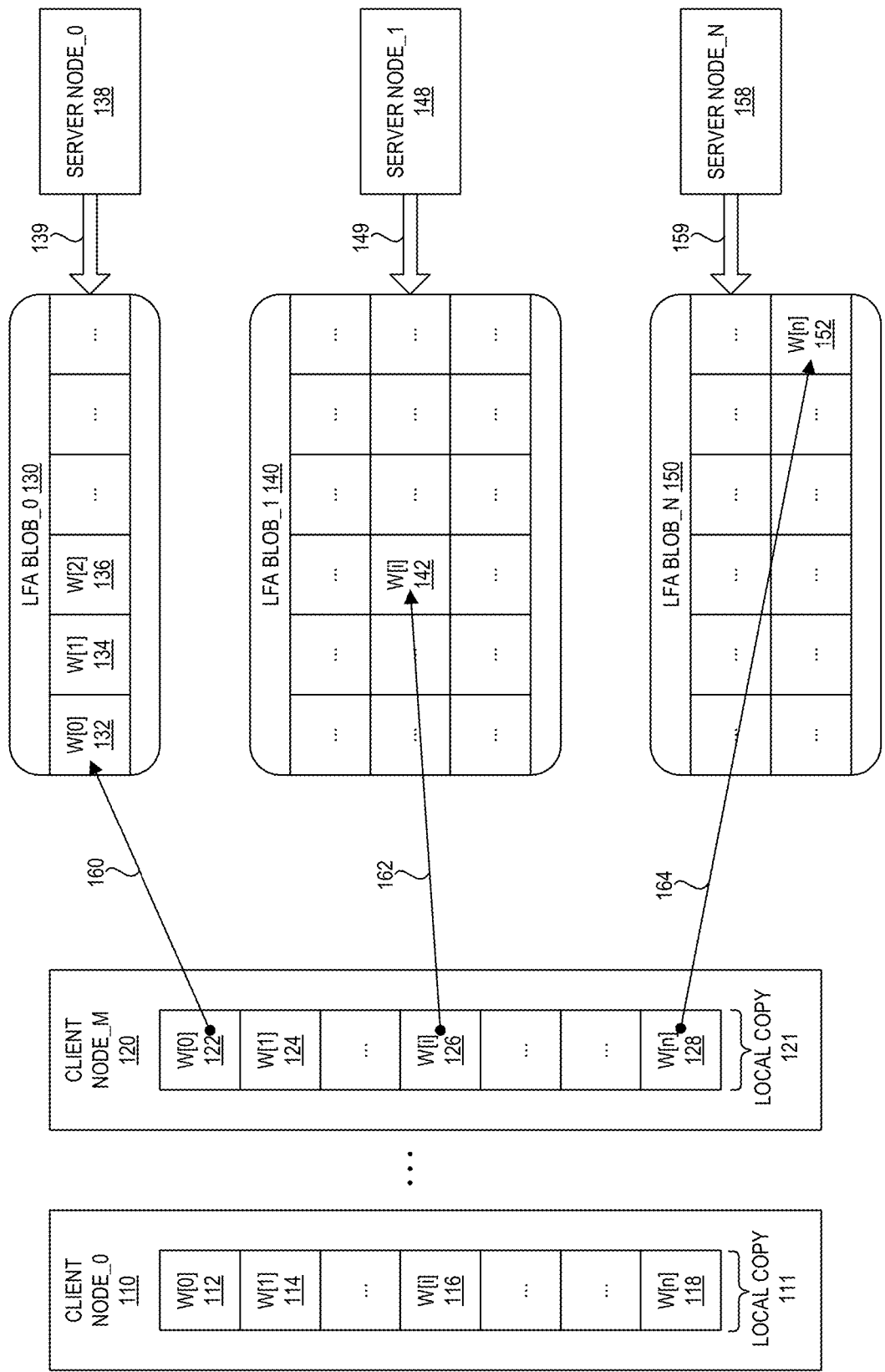
FIG. 1 illustrates a diagram of an exemplary environment for facilitating a libfabric atomics (LFA)-based shared memory access, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A crucial task in a distributed system or cluster with multiple components across multiple devices (e.g., high performance cluster (HPC) applications in large scale cluster compute environments) is the synchronization of access to cluster-wide shared variables and data structures. The implementation of a shared data access application programming interface (API) should strike a balance between guaranteeing coherency across all nodes and, at the same time, introducing as little extra latency as possible while accessing a shared entity for a read, write, or update operation.

Some current cluster synchronization methods involve a distributed lock manager (DLM), and use a message-based system, e.g., between a client and a server. However, as the number of nodes increases (e.g., in an HPC), the increased latency (due to sending, receiving, processing, and responding to messages, including obtaining and releasing locks) may become progressively prohibitive. Scalability can also be an issue. An increased load on a listening server, along with an increase in the scale of the system, may create a bottleneck. Other methods may use a shared message queue, but the performance of such systems may be limited due to the complexity of the implementation and the unavoidable bidirectional traffic.

The aspects described herein provide a system which addresses these challenges by providing cluster-wide lockless atomic operations using libfabric atomics (LFA) operations on shared memory regions. Given a distributed system or cluster with many nodes, any node can access shared data without acquiring locks, by simply using its local copy of a shared object to predict the result of a desired update and ensuring the coherency of the desired update using a compare-and-swap (CAS) libfabric operation. The system can algorithmically distribute the update target address across the remote memories of multiple nodes, which can result in keeping the collision rate in check. This can further result in reducing both the latency in performing operations and the contention of shared resources. The described system can be used to implement various types of shared objects, e.g., counters, bitmaps, structured data, and cluster-wide synchronization primitives like spinlocks, semaphores, and ring buffer queues.

Shared Atomic Data

In a distributed system, such as a clustered filesystem like the fabric attached memory filesystem (FAMfs), an important task is to maintain certain key data structures in memory and to share these data structures across all nodes which are actively using the filesystem. One solution is to keep all filesystem metadata in a shared coherent database. However, as the node count increases (as in an HPC), the performance involved in using such a shared coherent database can decrease exponentially. In the aspects described herein, the metadata is still maintained in a database, and is also loaded into memory upon startup, and is subsequently operated upon via libfabric atomics (LFA) API calls. The data structures which are accessed by these LFA API calls may remain relevant only while the FAMfs is active. The data structures can be rebuilt from the database upon every startup. Furthermore, the system can perform any and all relevant updates to the database by using the FAMfs software in the background, such that the updates do not affect the access of the shared metadata in the data structures via the LFA API calls. Because the database is never in the path of the LFA operations, it does not introduce any additional latency.

While using LFA calls, the entities may be referred to similar to a client-server model, from a logical standpoint, even though there are no servers in the traditional sense of the client-server model. In the aspects described herein, a "server" or "server node" can simply declare or allocate a certain region or portion ("blob") of its own memory as a shared object (which can be of any structure). The server node can register the allocated portions with the operating system, which informs the operating system that the allocated region needs to be locked in memory. The server node can also create access keys for the "clients" or "client nodes." This is the end of the server's responsibility. The remainder of the operations can be performed by the "clients," as described below in relation to FIG. 1. Note that these clients and servers may be the same node/process or different nodes/processes.

The system can operate on the shared objects of the allocated blobs as a single contiguous space composed of all the allocated blobs. This single contiguous space can be referred to as an "LFA area" or "shared remote memory content." The described system can include multiple LFA areas which are all independent of each other, i.e., LFA blobs allocated by different sets of server nodes in a distributed system. The size of each blob allocated by a server can be different, i.e., may not be the same size as the other blobs in a given LFA area.

In order to access shared data in a given LFA area, a node must attach to the LFA area via an LFA API call, which creates the necessary libfabric connections to all the servers of the given LFA area. The LFA API calls can operate using global offsets within the given LFA area. Using a particular offset, the LFA API can calculate the desired location in the remote memory, i.e., the libfabric address within the server which mapped a chunk of its memory as global space as well as a local offset within the given LFA area. The system can achieve server address resolution based on a quick binary search in an ordered array of the registered LFA blobs.

The coherency of libfabric atomic operations can be guaranteed only by using libfabric calls. As a result, all updates to content in the LFA area must be done via libfabric calls. For example, a client may only access the LFA area via an LFA API call, even if a target object or memory location is located within or resides in the memory of that same client.

A target object is a shared object which can be a 32-bit word or a 64-bit word at a given global offset within an LFA area. The system can support various operations for both 32-bit and 64-bit words. Bulk Get/Put operations can provide load/store, respectively, of remote memory into/from the local buffer. These operations do not guarantee coherency and should be used only when concurrency is not an issue, e.g., upon startup when the system populates the LFA areas from the database.

The system can support simple arithmetic operations (such as adding and subtracting a value from a remote location) as well as logical bitwise operations (such as logical AND, OR, and Exclusive OR (XOR) operations). In addition, the system can support compare-and-swap operations, in which the system can compare a retrieved remote value with a local value, and replace the remote value with a new value upon determining that the retrieved remote value matches the local value. The arithmetic and bitwise operations can support the "do-and-fetch" variant operations. Moreover, the atomic operations or commands may be implemented in hardware.

Because each client maintains its own full local copy of the shared remote memory content, each client can browse its local copy in a normal programmatic manner, without a need to lock anything. When performing an update to the shared remote memory content, the client can invoke an LFA API call to ensure that the update is both valid and coherent (e.g., using a "do-and-fetch" operation). If a collision occurs (i.e., when more than one node has attempted to update the same word in the remote memory at the same time), the responsibility lies with the client to recover from this collision. In practice, in a highly parallel distributed environment, the chance of collision may be low, which underscores the concept that in some cases, it may be simpler or more efficient to ask for forgiveness than for permission.

FIG. 1 illustrates a diagram of an exemplary environment 100 for facilitating shared atomic data, in accordance with an aspect of the present application. Environment 100 can include: multiple "server" nodes, such as a server node_0 138, a server node_1 148, and a server node_N 158; and multiple client nodes, such as a client node_0 110 and a client node_M 120 ("client nodes 110 and 120").

Each server node can allocate a "blob" of its local memory and register the allocated blob with the operating system to be accessed via remote direct memory access (RDMA). For example, server node_0 138 can allocate an LFA blob_0 130, server node_1 148 can allocate an LFA blob_1 140, and server node_N 158 can allocate an LFA blob_N 150. Each blob can include a plurality of bits, sets of one or more bits, or words. For example, LFA blob_0 130 can include at least: a word W[0] 132; a word W[1] 134; and a word W[2] 136. Similarly, LFA blob_1 140 can include at least a word W[i] 142 and LFA blob_N 150 can include at least a word W[n] 152. The system can thus create an "LFA area" or "shared remote memory content" which includes these allocated LFA blobs (130, 140, and 150).

Each client can subsequently attach to the LFA area to obtain its own local copy of the shared remote memory content. For example, each of client nodes 110 and 120 can attach to the LFA area composed or consisting of LFA blobs 130, 140, and 150 to obtain its own local copy of the shared remote memory content (e.g., a local copy 111 for client node_1 110 and a local copy 121 for client node_M 120). Client nodes 110 and 120 can bulk load the shared remote memory content in the LFA area into their respective local buffers using an lfa_get( ) call and begin working on the obtained local copy in their buffers.

Local copy 111 can include at least: a word W[0] 112; a word W[1] 114; a word W[i] 116; and a word W[n] 118. Local copy 121 can include at least: a word W[0] 122; a word W[1] 124; a word W[i] 126; and a word W[n] 128. The words in each of the local copies can correspond to words in each of LFA blobs 130, 140, and 150. For example: word W[0] 122 in local copy 121 can correspond to word W[0] 132 of LFA blob 130 (and can be accessed/updated in the LFA area via a communication 160); word W[i] 126 in local copy 121 can correspond to word W[i] 142 of LFA blob 140 (and can be accessed/updated via a communication 162); and word W[n] 128 in local copy 121 can correspond to word W[n] 152 of LFA blob 150 (and can be accessed/updated via a communication 164).

When a client node wishes to update a particular word within the LFA area, the system can issue an LFA API call (such as a libfabric operation) based on a new value for the particular word and a global offset for the particular word within the LFA area, e.g., by using the new value and the global offset as arguments to the LFA API call. The system can determine a target server associated with the LFA blob in which the particular word is stored, using a local offset within the remote memory of the target server, and can subsequently perform the libfabric atomic operation on the particular word (e.g., performing a "desired action" by replacing a current value with a new value).

Alternatively, if the LFA API call is for a "do-and-fetch" operation, the LFA API call can retrieve the current value of the particular word in the remote memory of the target server, prior to performing the desired action on the particular word. In order to verify that a collision does not occur, the system can compare the retrieved current value in the remote memory with the expected value in the local copy (e.g., a "local current value"). If the retrieved current value does not match the expected value, the client can take an appropriate action, e.g., to resolve the collision.

Shared Bitmap

Bitmaps are well known structures which are used extensively in filesystems and other applications that track free/used memory or storage space. Bitmaps can be implemented as a local memory array in which a single bit corresponds to a block of data. A value of the bit equal to "1" indicates that the block is used. A value of the bit equal to "0" indicates that the block is free. Operations on bits can be efficient because modern CPUs may implement various bit-manipulating commands in hardware. However, manipulating a single bit in a bitmap which is shared across multiple nodes in a distributed system (such as an HPC cluster) can create challenges.

In a fabric attached memory filesystem (FAMfs), the system can use LFA API calls to implement a shared bitmap which tracks usage of media "extents" in an "extent bitmap." FAM address space can be organized into a series of chunks, while a FAM module can be allocated in "extents." An extent can be a minimum unit of FAM allocation from a single FAM module. FAMfs can organize extents (which are allocated from different FAM modules) into "slabs" to facilitate implementation of a specific data protection scheme (which can be set at the file level). A slab can be used as a container for "stripes" (e.g., by serving as containers for allocation of stripes). Stripes are collections of data chunks with the same protection level as the respective container slab. A "slab map" is a data structure which can describe the geometry and construction of a layout, i.e., which FAM extents are placed together to form a respective slab to support a specific protection scheme. An "extent bitmap" is a data structure which tracks whether a given extent (on a FAM module or at the non-volatile memory express (NVMe) device level) is used or free.

Both the slab map and the extent bitmap can be shared data structures in FAMfs. In FAMfs, the system can implement the extent bitmaps as a global bitmap array using LFA-based cluster-wide data structures. These extent bitmaps can support space allocation across all FAM modules without the need for cluster-wide locks. This global bitmap array can be spread across all the nodes which allocate the FAM extents on behalf of the user processes of FAMfs.

Certain nodes in FAMfs can invoke LFA API calls on the extent bitmap data structure. For example, input/output (I/O) nodes in FAMfs can include an allocator module which allocates its specific shared memory region (for a slab map or an extent bitmap). These I/O nodes can be referred to as "allocator nodes." Each allocator node can also maintain its own local copy of the full bitmap, as described below in relation to FIG. 2. That is, each allocator node can be responsible for its own portion of the FAM pool, which can ensure the locality of the algorithms which perform the allocation. However, the product of the allocation—a bitmap of the allocated FAM extents indicating used/free status—can be a global entity which is shared across all participating nodes (e.g., I/O nodes or allocator nodes in FAMfs). This can result in guaranteeing the consistency of information related to allocation among all the participating nodes. In contrast, locking the entire map for each allocation would be prohibitively costly. The current solution thus provides an efficient manner of facilitating a shared global bitmap array across multiple allocating nodes in a distributed filesystem (e.g., FAMfs).

In FAMfs, one extent bitmap is used per FAM module, and extent bitmaps are shared only between allocator nodes and each node which needs to access the extent maps for all FAM modules in the FAMfs pool. As a result, a respective (each) server creates and allocates an LFA blob for the piece or portion of the global extent map which is the responsibility of the respective server. At the same time, the respective (each) server attaches to each LFA blob in the LFA area, including its own allocated LFA blob. As described herein, in order to ensure coherency at the CPU cache level, the system performs all LFA operations through LFA API calls, even when a respective server wishes to access data stored in its own allocated LFA blob. In FAMfs, the system determines the partitioning of the LFA extent map based on the LFA API caller (e.g., the FAMfs dynamic space allocator).

Figure 2:
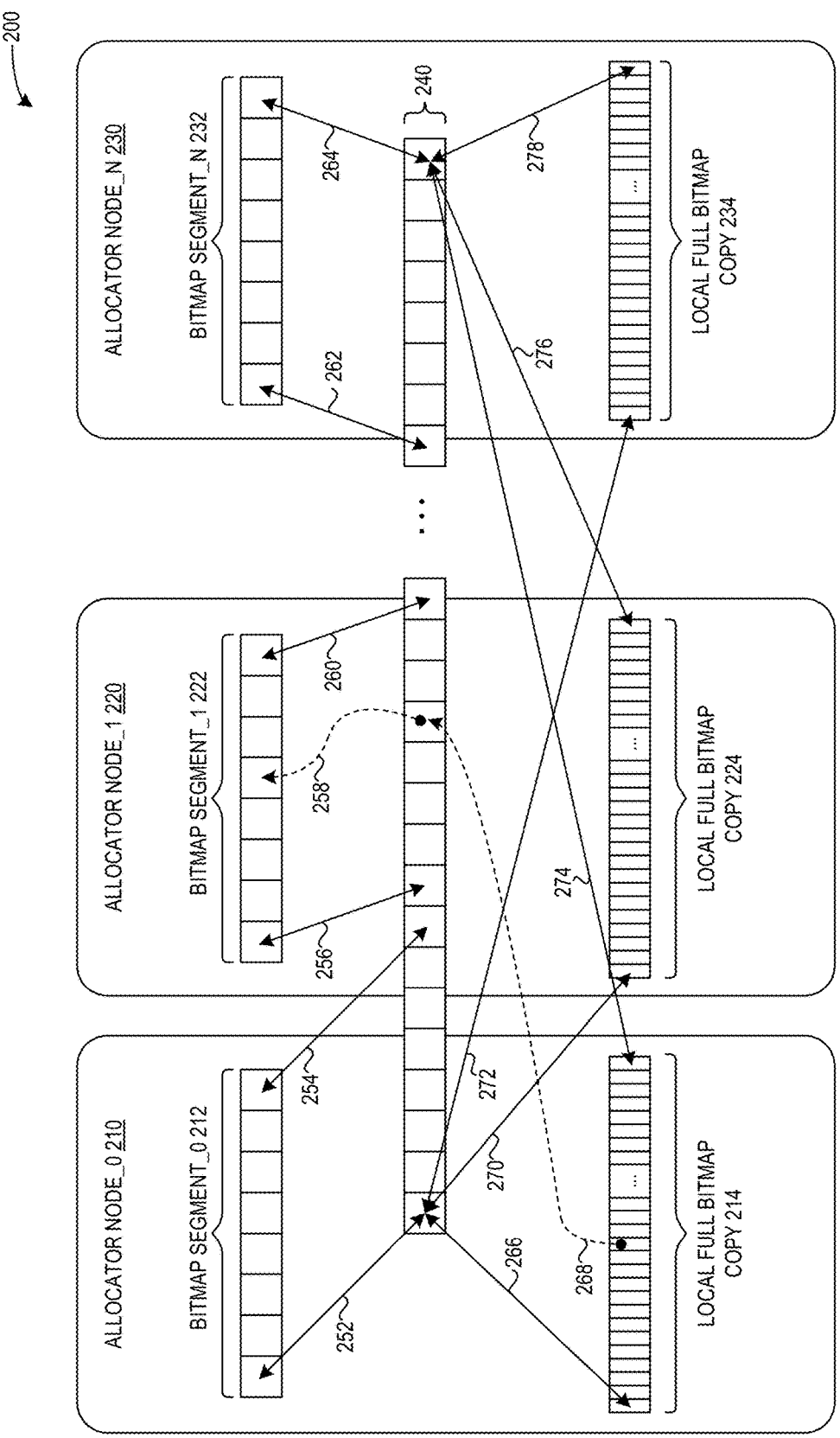
FIG. 2 illustrates a diagram of an exemplary environment for facilitating an LFA-based shared memory access, including a shared bitmap, in accordance with an aspect of the present application.

FIG. 2 illustrates a diagram of an exemplary environment 200 for facilitating shared atomic data, including a shared bitmap, in accordance with an aspect of the present application. Environment 200 can include a plurality of nodes: an allocator node_0 210; an allocator node_1 220; and an allocator node_N 230. Each allocator node can allocate its own "blob" or "bitmap segment." All of the allocated blobs or bitmap segments can be virtually or logically placed together to form the LFA area. Furthermore, each allocator node can obtain its own local copy of all the bitmap segments contained in the LFA area.

For example: allocator node_0 210 can allocate a bitmap segment_0 212, which can include a plurality of bits; allocator node_1 220 can allocate a bitmap segment_1 222, which can include a plurality of bits; and allocator node_N 230 can allocate a bitmap segment_N 232, which can include a plurality of bits. The bits in these allocated bitmap segments can be indicated by the blank square boxes. An LFA area 240 can represent a virtual bitmap which includes all the bitmap segments (e.g., 212, 222, and 232) allocated by the allocator nodes (e.g., 210, 220, and 230).

Allocator node_0 210 can obtain a local full bitmap copy 214 by attaching to virtual bitmap 240 (e.g., as indicated by arrows 266 and 274), which is further indicated as attaching to each of bitmap segments 212, 222, and 232 (e.g., as indicated, respectively, by: arrows 252 and 254 for bitmap segment_0 212; arrows 256 and 260 for bitmap segment_1 222; and arrows 262 and 264 for bitmap segment_2 232). Similarly, allocator node_1 220 can obtain a local full bitmap copy 224 by attaching to the allocated bitmap segments in a similar manner (e.g., as indicated by arrows 270 and 276). Allocator node_2 230 can also obtain a local full bitmap copy 234 by attaching to the allocated bitmap segments (e.g., as indicated by arrows 272 and 278).

The LFA API calls for the extent bitmap can implement a global find-first-clear-bit-and-set method which traverses the global bitmap to search for the first clear bit, beginning from a certain initial position. This initial position can be determined by an algorithm which aims to reduce contention among requesters, i.e., attempts to spread the bits out. Because the requesting process always has a local copy of the entire bitmap in its local buffer, the system can efficiently search the local buffer first via built-in central processing unit (CPU) instructions (e.g., by inverting the value and then performing a ffs( ) operation in x86). The ideal result is that the bit at the initial position is clear. However, if the bit at the initial position is not clear, the ffs( ) instruction can return the next available position. The API can subsequently execute an atomic logical OR-and-fetch libfabric call which attempts to propagate the new value to the global shared memory.

If the bit in the appropriate global memory location is clear, the operation completes successfully. If the bit in the appropriate global memory location is not clear, indicating that the bit was set by another actor or entity, the LFA call can return both an error code and the content of the global memory retrieved just prior to the attempt to set or propagate the bit. This provides an up-to-date snapshot of the current value of the bitmap, which allows the system to make an intelligent decision based on this information. The system, via the algorithm, may generally attempt to stay within the local area, e.g., on the same node as determined by the initial value calculated by a hash function. This can result in a reduction of I/O traffic in the fabric, and can also help to reduce concurrency. The system may move to the LFA area of another node only upon discovering that all the bits in its "local" LFA area are set.

Note that the "fetch" portion of the LFA API call can always be executed. Thus, even in the event of a successful first try to set a bit, the system can return the updated content or current value of global memory, including all the bits that were potentially set by other operations. From the point of view of each allocator node, the extent bitmap may represent a type of self-healing local copy of the globally shared memory.

Cluster-Wide Spinlocks and Semaphores

While the LFA API calls can provide lock-free access to shared data (as described above), it is generally limited to operating on separate words of memory. In some instances, the system may need to guarantee consistent transactional access to multiple fields at one time, e.g., when a certain data structure needs to be traversed and subsequently extended or updated while preserving consistency across more than one word of data. Because LFA API calls are generally coherent only within the boundary of a word, the system must regulate access to the entire structure in a different manner.

The aspects described herein regulate access to the entire data structure by implementing a global spinlock. A spinlock can be used in the kernels of modern operating systems to provide synchronization between multiple threads. In the described aspects, the system can create a global, cluster-wide spinlock based on LFA API calls. When a calling process needs to acquire the spinlock, the process can issue an LFA compare-and-swap (CAS) call into one of the predefined LFA areas that holds locks for different purposes. The CAS call can set a remote location to a certain value, but only if the remote location contains an initial value which matches an expected value (e.g., if the retrieved current remote value matches a local current value). If the retrieved value matches the expected value, the operation succeeds. The calling process can acquire the spinlock and continue as needed.

If the retrieved value does not match the expected value, this indicates that another process has already acquired the spinlock and is working on the data protected by the spinlock. The calling process subsequently reissues the CAS call and continues "spinning" in the loop, until either a successful acquisition of the spinlock or an expiration of a timeout period. When the calling process (or any other process which acquires the spinlock) is done updating the data in the critical section, that process can release the spinlock by issuing a simple LFA write call, which can reset the value of the remote spinlock to the unlocked state.

Similar to the global, cluster-wide spinlock, LFA API calls can implement a cluster-wide counting semaphore which facilitates access to countable resources. Instead of using the CAS call, the semaphore API can employ atomic add-and-fetch and decrement-and-fetch calls. When a new free object is detected in a pool protected by the semaphore, the system can atomically increase the value of the semaphore by one. If a client or other entity needs to acquire an object in the pool protected by the semaphore, the client can attempt to decrement the semaphore by one. If the value of the semaphore (after the decrementing attempt) is greater than zero, the operation can proceed. If the value of the semaphore is not greater than zero (after the decrementing attempt), which indicates that the semaphore was already at zero at the time of the call, the client can retry the attempt to acquire the object at a later time.

Both the global spinlock and the global semaphore implementations are based on the LFA area, as described herein, and both of these synchronization primitives can make use of the LFA infrastructure. For example, the system can keep these two synchronization primitives in either a special LFA area separate from other shared data or as part of global structures which contain both the lock and the protected data structure, as described below in relation to FIG. 3.

Table of Contents and Counters Array

In large-scale systems, such as HPC applications and distributed systems or clusters, one critical task is to keep track of the use of resources for purposes of both statistical performance analysis and actual resource planning and distribution. This can be a challenging task because access to these resources can be concurrent on a massive scale in HPC application. The above description relates to implementing atomic counters using the LFA API, but allocating these counters can be a challenging task in a system in which thousands of nodes simultaneously create hundreds of files.

One aspect of the described system provides a simple and reliable mechanism to allocate various use counters across a cluster. The system provides a Table of Contents (TOC) which keeps track of all existing counters. The system also allocates a block of memory to contain the counters themselves. The system can partition the TOC and the counters block (or blob) in the same manner as a regular LFA area, to spread the traffic of the fabric across multiple server nodes. The system can protect each TOC partition with a global spinlock.

In the example of FAMfs, each file has a unique identifier ("FileID"), as described below. A client can perform a TOC lookup for a given FileID in a given LFA by first looking in its local copy of the TOC, without acquiring the global spinlock, in accordance with the general principle of LFA. If the given FileID is found in the local copy of the TOC, there is a high probability that the file is already stored in the corresponding global memory location. The client can then acquire the spinlock on the TOC partition belonging to the given LFA, and verify this. If the file has been already disposed of by another process and the global TOC entry is empty or contains a different FileID, the system can perform a full scan of the TOC and allocate a new TOC entry. If the given FileID is not found in the local copy of the TOC, the system can acquire the global spinlock on the TOC partition belonging to the given LFA, based on an algorithmic decision. The system can subsequently search for the FileID in the records of the TOC, e.g., to find an empty entry or an entry with the given FileID, if it was already allocated by another client process. Similar to the general principle of LFA design, all counters-related operations are one-sided, such that there is no exchange of messages between clients and servers. All operations are atomic RDMA transactions from the client to the memory of the server node.

In FAMfs, the filesystem must keep track of open files as well as updates to these open files. FAMfs is a checkpoint-restore oriented filesystem, and thus must also keep track of when files are "laminated," i.e., when the erasure code (EC) calculation has been completed for a file and the file is protected from system, device, or FAM module failures. However, because the EC encoding process is not performed on files and instead is performed on physical chunks of data in the FAM modules, the aspects described herein provide an alternative manner of tracking the lamination progress. One solution is to simply allocate a predefined number of counters. However, this can be either wasteful, if too many counters are allocated, or extremely inefficient, if a client process is required to wait for a counter to become available.

In FAMfs, each file has a unique identifier ("FileID") which is derived from the fully qualified name of the file. This FileID can be used to keep track of all the counters associated with the file, e.g.: open count; write count; etc. When the system issues an open_file( ) call, the client process first searches for the FileID (e.g., "X") in the TOC in a designated LFA area. The TOC LFA can be shared among all server nodes (as described above in relation to FIG. 1) and can be protected by a global spinlock (as described below in relation to FIG. 3). Similar to the general LFA principles, the system aims to distribute the load algorithmically as much as possible. The system can use the FileID as an input to a hash function which can evenly distribute the load across all nodes that serve a given LFA area. The hash function can provide a high probability that multiple open_file( ) calls from the same client node will be directed to different server nodes, which can result in maintaining equal loads on all I/O nodes in the cluster. Thus, the hash function can determine that a particular server is responsible for a particular file based on the unique FileID of the file. The system can translate the file name to its unique FileID, which points to a particular LFA area, similar to the extent bitmaps described above in relation to FIG. 2.

Figure 3:
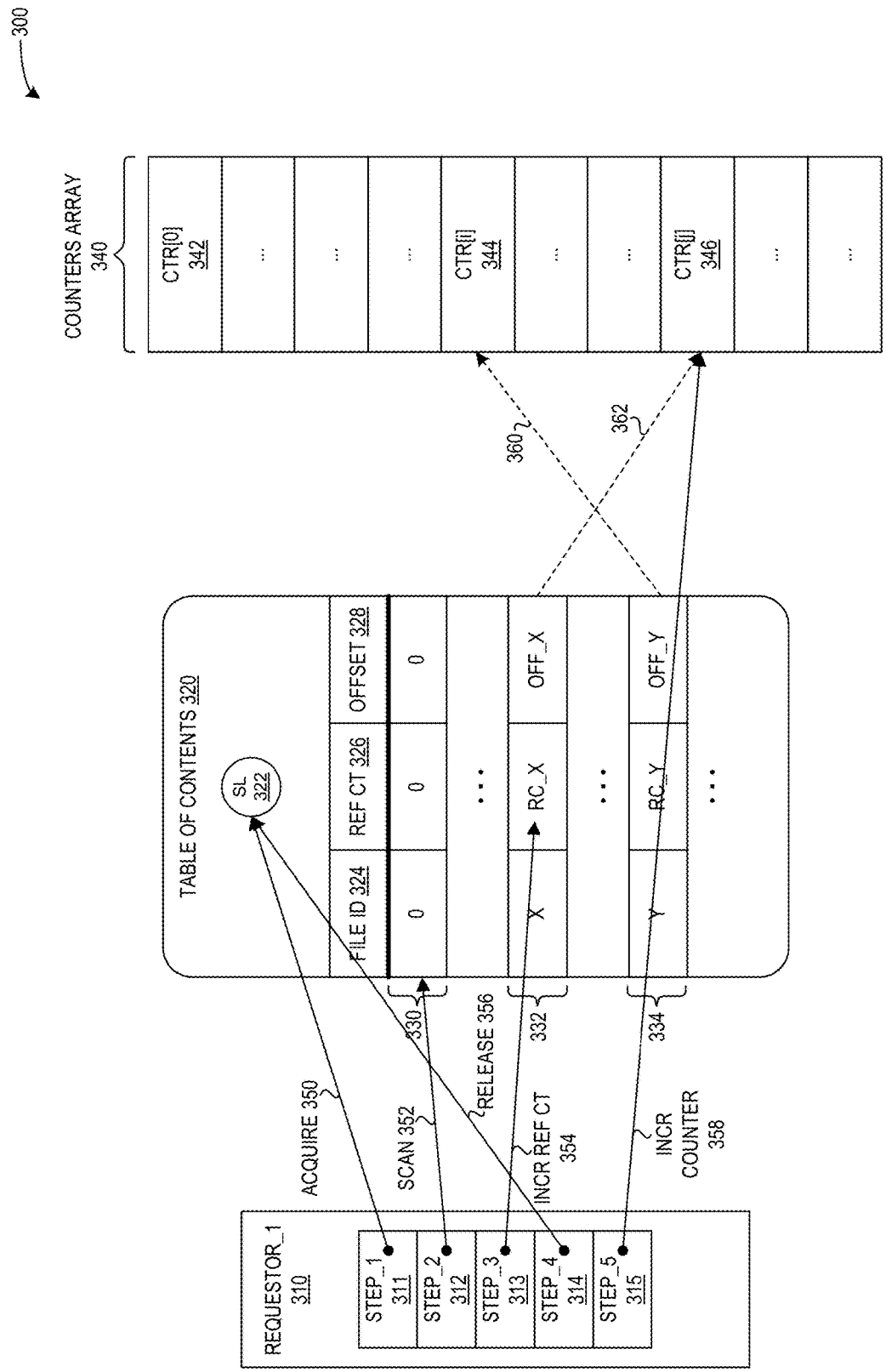
FIG. 3 illustrates a diagram of a table of contents, a counters array, and exemplary communications associated with accessing files in a filesystem, in accordance with an aspect of the present application.

FIG. 3 illustrates a diagram 300 of a table of contents 320, a counters array 340, and exemplary communications associated with accessing files in a filesystem, in accordance with an aspect of the present application. Diagram 300 can include a requestor_1 310 (such as a client process), table of contents (TOC) 320, and counters array 340. Requester_1 310 can perform a series of steps (311-315) to access a particular file. TOC 320 can include an associated spinlock (SL) 322 and entries which indicate at least: a file ID 324 for a given file (e.g., the FileID); a reference count 326, which can indicate how many clients currently have the given file open; and an offset 328, which can be an offset in counters array 340. Counters array 340 can be an array which is allocated for maintaining the counters for a given FileID. An entry 330 in TOC 320 can include a FileID of "0," a reference count of "0," and an offset of "0," which can indicate an empty entry. An entry 332 in TOC 320 can include a FileID of "X," a reference count of "RC_X," and an offset of "OFF_X." Similarly, an entry 334 in TOC 320 can include a FileID of "Y," a reference count of "RC_Y," and an offset of "OFF_Y." The reference count and the offset can be integer values.

When the system, by a client process, wishes to open a file with a FileID="X," the client process can first calculate the TOC to which this FileID belongs, e.g., by using the hash function. As described above, the client can first perform a lookup for the FileID in its local copy of the TOC without acquiring the global spinlock. If the FileID does not exist in the local TOC, the client process can determine that TOC 320 of a particular LFA (not shown) is the appropriate TOC. The client process can acquire spinlock 322 for TOC 320 (as indicated by a step_1 311 and an acquire 350 communication). The client process can scan TOC 320 for the FileID of "X" (as indicated by a step_2 312 and a scan 352 communication). The scanning process can start at entry 330. If the client process does find the FileID of "X" (i.e., matching entry 332), the system can increment the reference count (as indicated by a step_3 313 and an increment reference count 354 communication). If the client process does not find the FileID of "X" (e.g., if entry 332 did not exist in TOC 320), the system can create an entry for FileID of "X," increment the reference count by one, initialize any other relevant counters, and record in the new TOC entry a selected offset in counters array 340 (e.g., by using a first available or other manner of determining an element in counters array 340 in which to keep track of the current value of the counter itself).

Subsequently, the client process can release spinlock 322 (as indicated by a step_4 314 and a release 356 communication), which makes TOC 320 available to any other requesting client processes, nodes, or entities. At this point, the client process can now directly access and operate on the counter in the counters array. For example, the client process can increment the appropriate counter in counters array 340 (as indicated by a step_5 315 and an increment counter 358 communication). The client process can determine the location in counters array 340 of the appropriate counter by using offset 328 of matching entry 332 (as indicated by a dashed arrow 362 from entry 332 to an element indicated as "Counter[j]" 346 in counters array 340).

In this way, once the file is opened, the client process can determine, using one or more counters, e.g., how many writes have occurred (a first counters array) versus how many writes have been committed (a second counters array). The system is not limited to one or two counter arrays, and can use as many or as few as needed. The system can wait for a parity thread to calculate the parity on a certain number of blocks corresponding to a file. Upon completing the parity calculation for all of those blocks, the system can determine that the file is ready for lamination.

The system may access these counters frequently, because processing data blocks can result in accessing and incrementing the appropriate counters. Using LFA API calls and spreading these TOCs and counter arrays into separate LFA areas can result in minimizing contention for the counters. The latency involved in performing steps 311-314 (in FIG. 3) need only occur once, upon opening the file. Once the client process has determined the offset, the client process can directly access the counter without any further locking, i.e., can use only LFA API calls in a lockless cluster-wide manner. This brief delay on opening/closing a file does not affect the performance in any significant manner, as the system is performing many other operations in parallel with the TOC lookup, which can hide or cover this additional latency.

When the system, by the client process, wishes to close the opened file, the system again acquires SL 322, locates the entry for the requested FileID, and decrements the reference count by one. If the reference count is "0," indicating that no other entities, processes, or nodes in the cluster have the file open, the system can delete the corresponding offset in the entry and the associated element or block in counters array 340. The system can perform the appropriate updates, and subsequently release spinlock 322.

Thus, a client process does not need to know the actual physical location of a counter for a given file. Using the steps and operations described above, the client process can simply look up the relevant information in a determined TOC, and proceed as described above.

Global Ring Buffer Queue

While the above-described aspects address atomic operations on certain remote shared memory content (by eliminating message-passing), nodes in an HPC cluster must still perform message-passing (e.g., by using message queues), as this is a fundamental task in any distributed application. In general, message queue implementations are relatively complex and require a significant amount of resources. The described aspects of the system use a simplified mechanism to provide a shared queue that can deliver short, fixed-size messages from node to node quickly and in a lower resource-consuming manner.

The system is based on the one-sided communications as described above for LFA API calls and operations, and uses a Ring Buffer Queue (RBQ). The RBQ is a distributed structure which is partitioned as "segments" among a plurality of servers, similar to the extent bitmap or the data contained in LFA blobs which compose an LFA area. Each RBQ segment can include: a block of memory which holds messages being transferred; two semaphores to synchronize access; and two pointers/counters to keep track of positions relating to insert and remove operations, as described below in relation to FIG. 4.

Thus, logically, a single shared RBQ can include a plurality of partitions or segments, which are each served by a separate server node, similar to how each LFA blob is served by a separate server node. The details of this implementation are not visible to the clients. A client can simply attach to a queue by name. The RBQ can include an API, which can automatically handle the routing of an incoming request.

Each server in a distributed system (e.g., each I/O or allocator node in FAMfs) can create a segment for a particular queue and can also maintain the LFA area which holds all the necessary components for or associated with the created segment. The system can fix the size of the RBQ at startup. The system, by each respective server node, can also initialize all the necessary components when creating the segment or queue. The system can create multiple queues, and any node may be both a server for one RBQ and a client for another. Clients can attach to existing queues, which can result in bumping the atomic use counter on the server to keep track of the overall usage of the queue and to prevent unexpected behavior upon exiting the queue.

Figure 4:
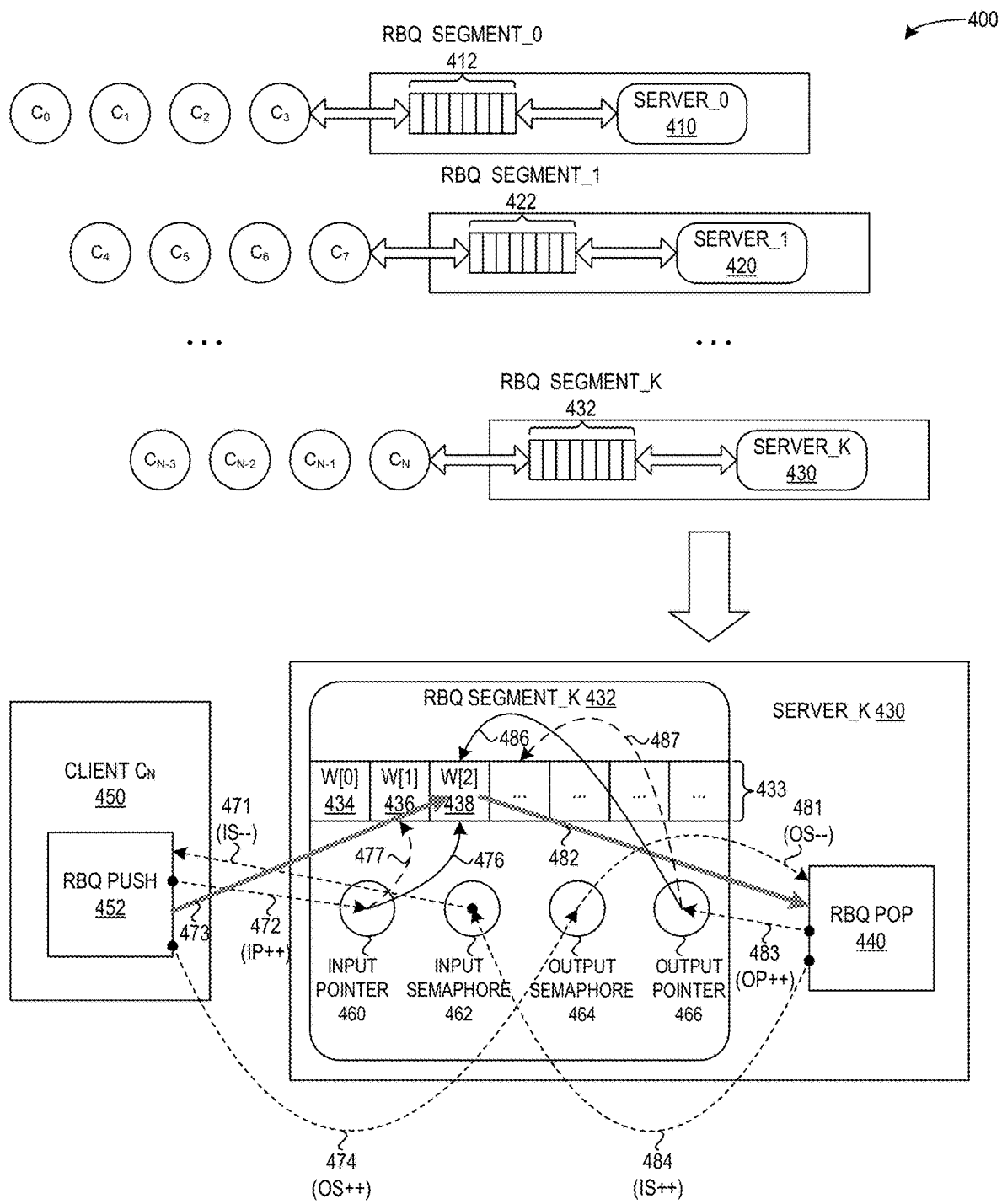
FIG. 4 illustrates an exemplary environment for facilitating usage of a shared ring buffer queue to deliver messages using an LFA-based shared memory access in a distributed system, in accordance with an aspect of the present application.

FIG. 4 illustrates an exemplary environment 400 for facilitating usage of a shared ring buffer queue to deliver messages, in accordance with an aspect of the present application. Environment 400 can include a plurality of clients (e.g., clients $C_0$-$C_N$) and a plurality of servers, including: a server_0 410; a server_1 420; and a server_K 430. Each server can create an RBQ segment, which can comprise, contain, include, or be a queue. For example: server_0 410 can create an RBQ segment_0 412; server_1 420 can create an RBQ segment_1 422; and server_K 430 can create an RBQ segment_K 432.

Clients can attach to the RBQ segments to obtain a local copy of the RBQ, similar to how clients can attach to each LFA blob or extent bitmap segment to obtain the respective local copies (as described above in relation to FIGS. 1 and 2, respectively). For example: client $C_3$ can attach to RBQ segment_0 412; client $C_7$ can attach to RBQ segment_1 422; and client $C_N$ can attach to RBQ segment_K 432.

The lower half of FIG. 4 depicts a detailed view of communications between client $C_N$ 450 and server_K 430. Client $C_N$ 450 can include an RBQ push module 452 which handles access to a particular RBQ segment, and server_K 430 can include an RBQ pop module 440 which handles access to the particular RBQ segment. RBQ push 452 and RBQ pop 440 can be a module, process, component, or unit implemented in middleware, software, or hardware.

Server_K 430 can also include RBQ segment_K 432, which can include: a block of memory 433 (e.g., an array 433 or a queue 433) which can hold data/messages being transferred in elements such as W[0] 434, W[1] 436, and W[2] 438; an input semaphore (IS) 462 and an output semaphore (OS) 464 to synchronize access to queue 433; and an input pointer (IP) 460 and an output pointer (OP) 466 to track positions for insertion and removal of messages from queue 433.

Upon performing initialization and other startup processes, the system can set IS 462 to the maximum size of queue 433. The system can set OS 464 to "0" to indicate that there is no data (e.g., messages) stored in queue 433. The system can also set both IP 460 and OP 466 to "0" as initial values.

During operation, a client (e.g., client $C_N$ 450) who wishes to place a message in the ring buffer queue (e.g., queue 433) can first attempt to acquire IS 462. The value of IS 462 can indicate the number of free slots in the queue. If the value of IS 462 is greater than "0," client $C_N$ 450 can acquire IS 462 by decrementing the value of IS 462 by "1" (as indicated by a step 471 (IS--)). If the value of IS 462 is "0" (indicating that there are no free or available slots in the RBQ or queue 433), the client must wait until the server is done processing a request and releases IS 462. Waiting for a semaphore to become available is described below.

Upon successfully acquiring IS 462, the client can increment IP 460 (as indicated by a step 472 (IP++), such that instead of IP 460 pointing to W[1] 436 (as indicated by a dashed curved arrow 477), IP 460 now points to W[2] 438 (as indicated by a bold curved arrow 476). Because the RBQ is a circular buffer, the system can set IP 460 to "0" again upon reaching the end of the buffer (i.e., queue 433). Client $C_N$ 450 can send data (such as a message) via RDMA to the slot of memory pointed to by IP 460 (as indicated by a step 473). Recall that every message in RBQ segment_K 432 is of the same fixed size. Thus, the system can calculate the position of this memory (corresponding to W[2] 438) using a simple offset-based calculation. Finally, client $C_N$ 450 can release OS 464 by incrementing the value of OS 464 by "1" (as indicated by a step 474 (OS++)). This incrementing can inform server_K 430 that that there is data in queue 433 which is ready to be processed.

During normal operation, server_K 430 can wait on OS 464, which has a value of "0" when queue 433 is empty. When OS 464 is incremented by client $C_N$ 450 (as part of step 474), server_K 430 can acquire OS 464 by decrementing the value of OS 464 by "1" (as indicated by a step 481 (OS--)). Server_K 430 can proceed, via RDMA, to retrieve the message stored at the location pointed to by OP 466 (i.e., W[2] 438) (as indicated by a step 482). Upon retrieving the message or data from queue 433, server_K 430 can increment OP 466 by "1" (as indicated by a step 483 (OP++)), such that instead of OP 466 pointing to W[2] 438 (as indicated by a solid curved arrow 486), OP 466 now points to the next element in queue 433 (as indicated by a dashed curved arrow 487). Similar to how IP 460 works for client $C_N$ 450, OP 466 can wrap around to the start of the circular RBQ segment when OP 466 reaches the end of queue 433. To avoid holding onto valuable resources, server_K 430 can copy data from global memory to its local buffer (not shown), and can subsequently release IS 462 by incrementing the value of IS 462 by "1" (as indicated by a step 484 (IS++)), which results in indicating that a free slot has become available. Note that while the control information of each queue (e.g., IP 460, OP 466, IS 462, and OS 464) can be stored in the LFA areas, the data segments of each queue do not need to be stored in the LFA areas. The data segments may exist only on the "server" node, i.e., for the process which owns a particular queue segment. When the IP/OP state is determined by atomic transactions, as described above, the client can perform a regular RDMA read/write from/to a respective data segment defined by these pointers. Thus, the client does not need to keep a local copy of the entire queue because the atomicity of RDMA is guaranteed by the queue semaphores in LFA.

Waiting for a semaphore to be available can be implemented in different ways. A first implementation for a process who wishes to acquire a semaphore is to simply spin on an atomic CAS call until the value changes. The wait involved in this spin time is localized. That is, although the system may waste local CPU cycles while waiting, the spin time does not produce traffic in the fabric, because the value being checked resides in the memory of the same node. However, CPU cycles are still expended with this method.

A second implementation is to use regular messaging between the client and the server, e.g., to send a notice or wake-up message to the server after a client inserts an element into a previously empty queue. In this implementation, the server can go to sleep and wait for a wake-up message as soon as its queue is exhausted. This solution does introduce an initial latency upon wake-up, but can reduce the usage of resources while the system is idle. In a scenario with many messages, the server will not to go sleep, no wake-up messages are passed, and the system can operate with speed. However, this implementation still involves the initial latency upon wake-up. The system can offset this initial latency by only sending the server a wake-up message when a certain or predetermined number of messages are in the queue, rather than sending a wake-up message each time the queue size hits "1" (or some other number smaller than the predetermined number).

A third implementation is to utilize libfabric RDMA counters to facilitate the server wake-up. Some libfabric providers allow for the use of "passive" RDMA counters, where a counter can change its value if a certain memory region is accessed (e.g., written or read). Such an implementation can support separate counters for read and write operations. Upon emptying its queue, the server can sleep on the write counter. A client, via an RDMA transaction through hardware, can place data or a message in the RBQ segment queue, increment the RDMA counter, and wake up the server.

Upon wake-up, the server can check the semaphore value, and if data has entered the queue, the server can process all the data in the queue (via RDMA) and reset the RDMA counter to "0." If the semaphore is still locked (as reflected by the semaphore value), this indicates that the RDMA counter has reacted to some other transaction in the memory region, and the server can return to sleep.

Thus, nodes in a distributed system (such as FAMfs) can use a cluster-wide RBQ for all intra-node communication. This cluster-wide RBQ can be implemented as partitioned segments which are allocated across and by multiple nodes (e.g., server nodes, allocator nodes, or I/O nodes in FAMfs) in the distributed system.

Exemplary Method for Facilitating Shared Atomic Data

Figure 5A:
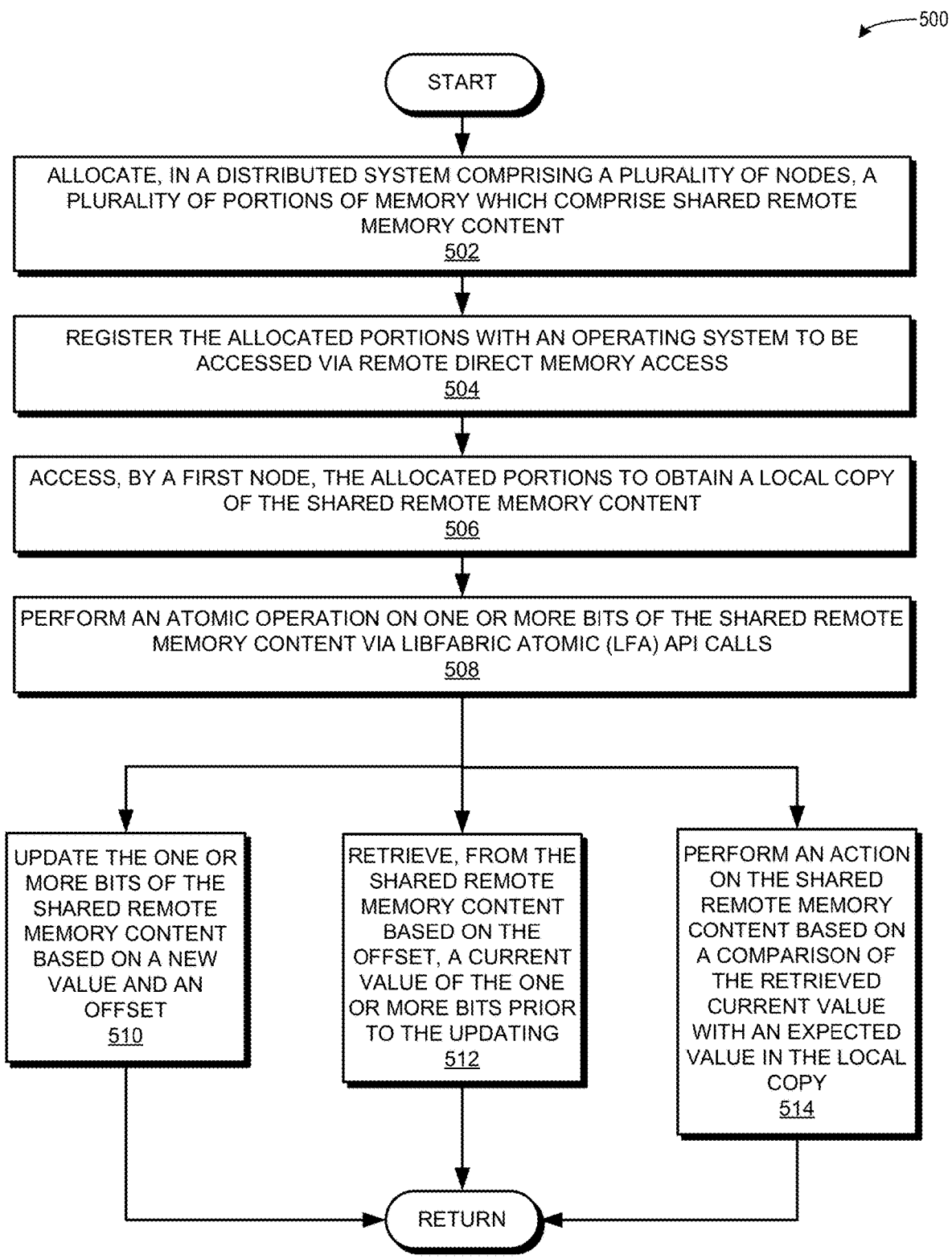
FIG. 5A presents a flowchart illustrating a method which facilitates an LFA-based shared memory access in a distributed system, in accordance with an aspect of the present application.

FIG. 5A presents a flowchart 500 illustrating a method which facilitates an LFA-based shared memory access in a distributed system, in accordance with an aspect of the present application. During operation, the system allocates, in a distributed system comprising a plurality of nodes, a plurality of portions of memory which comprise shared remote memory content (operation 502). The system registers the allocated portions with an operating system to be accessed via remote direct memory access (operation 504). The system accesses, by a first node, the allocated portions to obtain a local copy of the shared remote memory content (operation 506). The system performs an atomic operation on one or more bits of the shared remote memory content via libfabric atomic (LFA) application programming interface (API) calls (operation 508), by performing one or more of the following operations. The system updates the one or more bits of the shared remote memory content based on a new value and an offset (operation 510). The system retrieves, from the shared remote memory content based on the offset, a current value of the one or more bits prior to the updating (operation 512). The system performs an action on the shared remote memory content based on a comparison of the current value with an expected value in the local copy (operation 514).

Figure 5B:
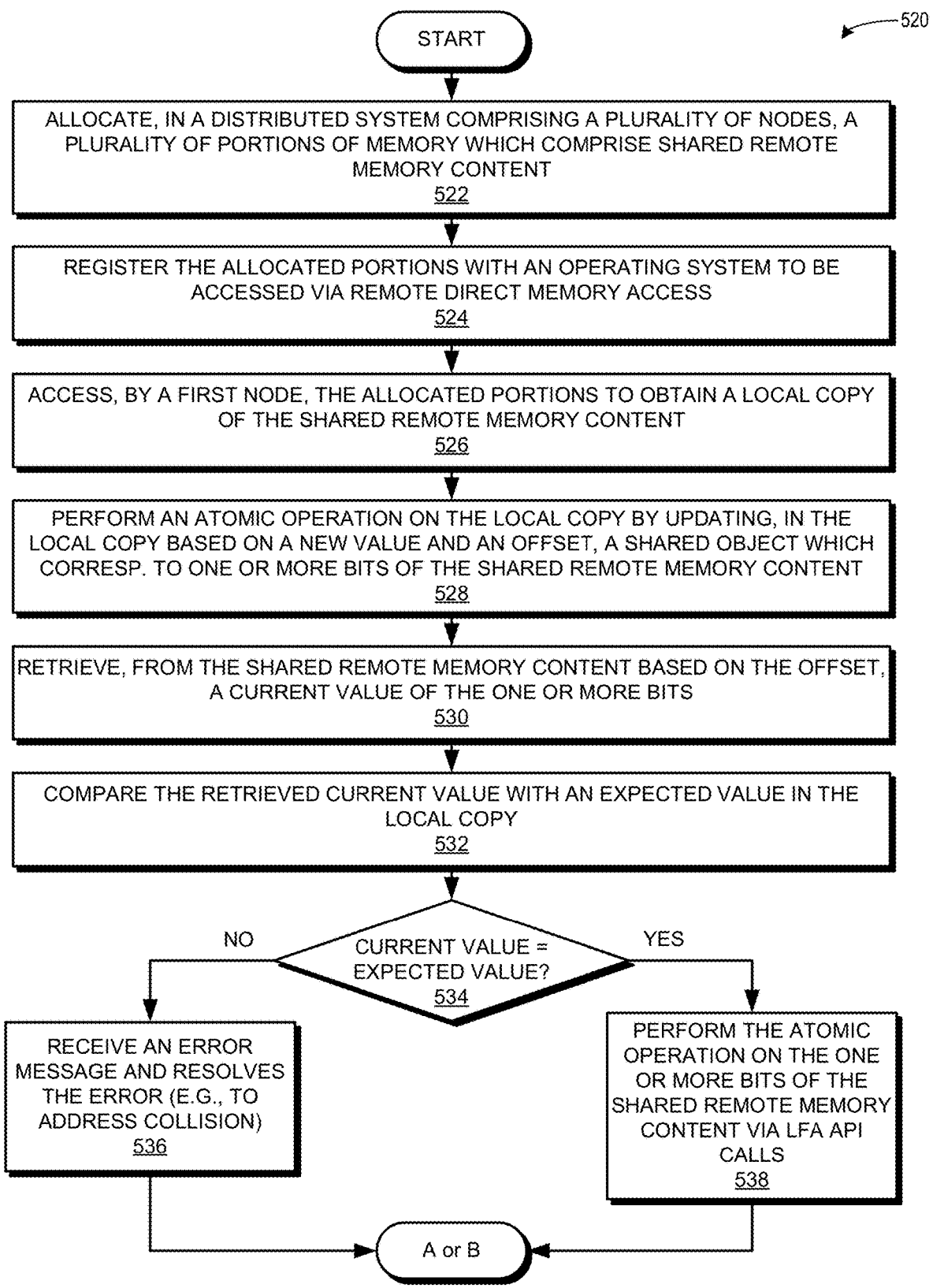
FIG. 5B presents a flowchart illustrating a method which facilitates an LFA-based shared memory access in a distributed system, in accordance with an aspect of the present application.

FIG. 5B presents a flowchart 520 illustrating a method which facilitates an LFA-based shared memory access in a distributed system, in accordance with an aspect of the present application. During operation, the system allocates, in a distributed system comprising a plurality of nodes, a plurality of portions of memory which comprise shared remote memory content (operation 522). The system registers the allocated portions with an operating system to be accessed via remote direct memory access (operation 524). The system accesses, by a first node, the allocated portions to obtain a local copy of the shared remote memory content (operation 526). The system performs an atomic operation on the local copy by updating, in the local copy based on a new value and an offset, a shared object which corresponds to one or more bits of the shared remote memory content (operation 528). The system retrieves, from the shared remote memory content based on the offset, a current value of the one or more bits (operation 530). The system compares the retrieved current value with an expected value in the local copy (operation 532).

If the current value does not match the expected value (decision 534), the system receives an error message and resolves the errors (e.g., to address a collision) (operation 536). If the current value matches the expected value (decision 534), the system performs the atomic operation on the one or more bits of the shared remote memory via libfabric atomic (LFA) application programming interface (API) calls (operation 538). The operation continues at either Label A of FIG. 6A or Label B of FIG. 6B.

Exemplary Method for Accessing Files and Using a Shared Ring Buffer Queue

Figure 6A:
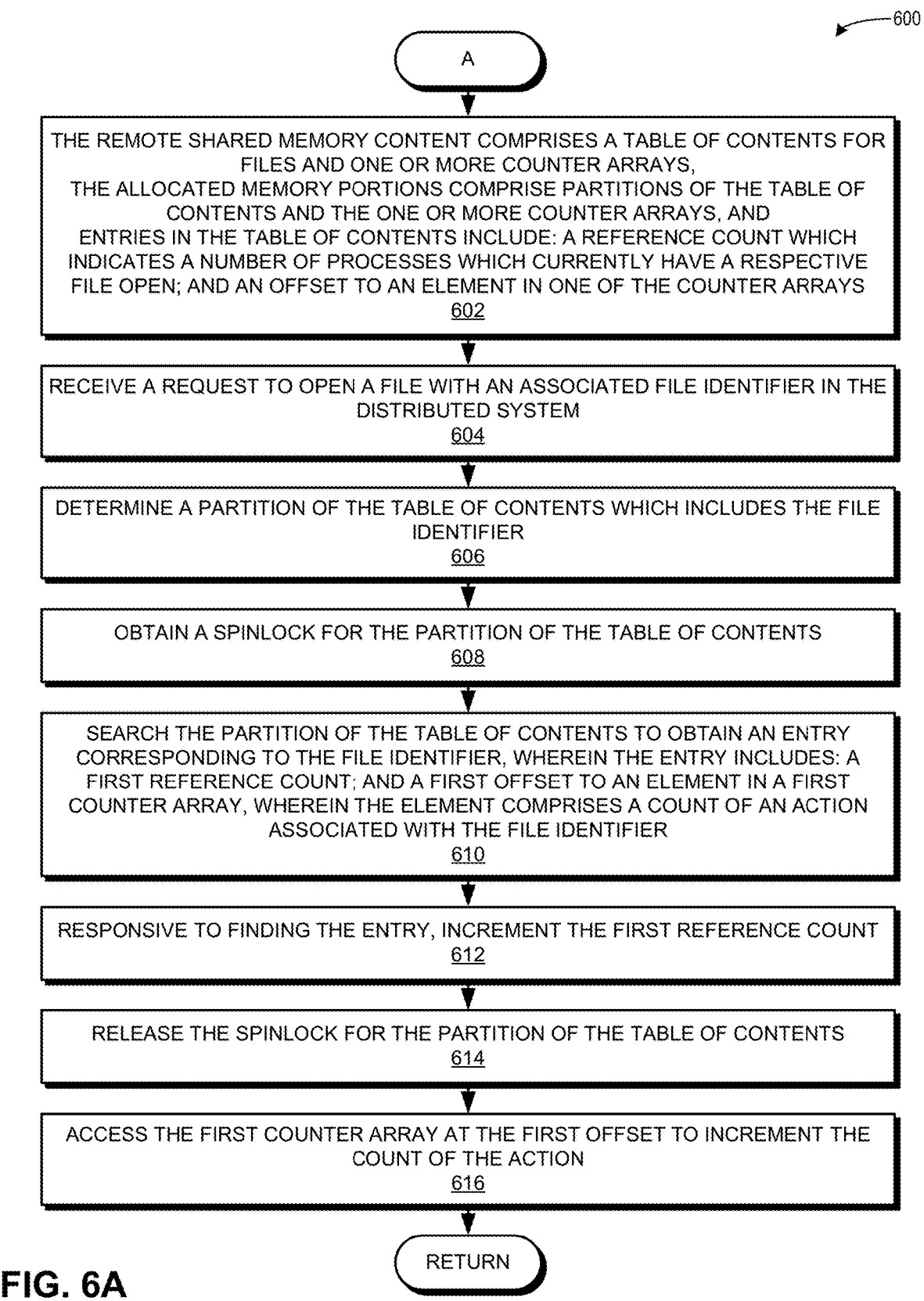
FIG. 6A presents a flowchart illustrating a method which facilitates accessing files in a filesystem using an LFA-based shared memory access in a distributed system, in accordance with an aspect of the present application.

FIG. 6A presents a flowchart 600 illustrating a method which facilitates accessing files in a filesystem using an LFA-based shared memory access in a distributed system, in accordance with an aspect of the present application. The remote shared memory content comprises a table of contents for files and one or more counter arrays, the allocated memory portions comprise partitions of the table of contents and the one or more counter arrays, and entries corresponding to the files in the table of contents include: a reference count which indicates a number of processes which currently have a respective file open; and an offset to an element in one of the counter arrays (operation 602). The system receives a request to open a file with an associated file identifier in the distributed system (operation 604). The shared remote memory content can be accessed by a filesystem (e.g., FAMfs) associated with the distributed system. The system determines a partition of the table of contents which includes the file identifier (operation 606). As described above, the client can first perform a lookup for the file identifier in its local copy of the TOC without acquiring a spinlock. If the FileID does not exist in the local TOC (not shown), the system obtains a spinlock for the partition of the table of contents (operation 608). The system searches the partition of the table of contents to obtain an entry corresponding to the file identifier, wherein the entry includes: a first reference count; and a first offset to an element in a first counter array, wherein the element comprises a count of an action associated with the file identifier (operation 610). Responsive to finding the entry, the system increments the first reference count (operation 612). The system releases the spinlock for the partition of the table of contents (operation 614) and accesses the first counter array at the first offset to increment the count of the action (operation 616). The operation returns.

Figure 6B:
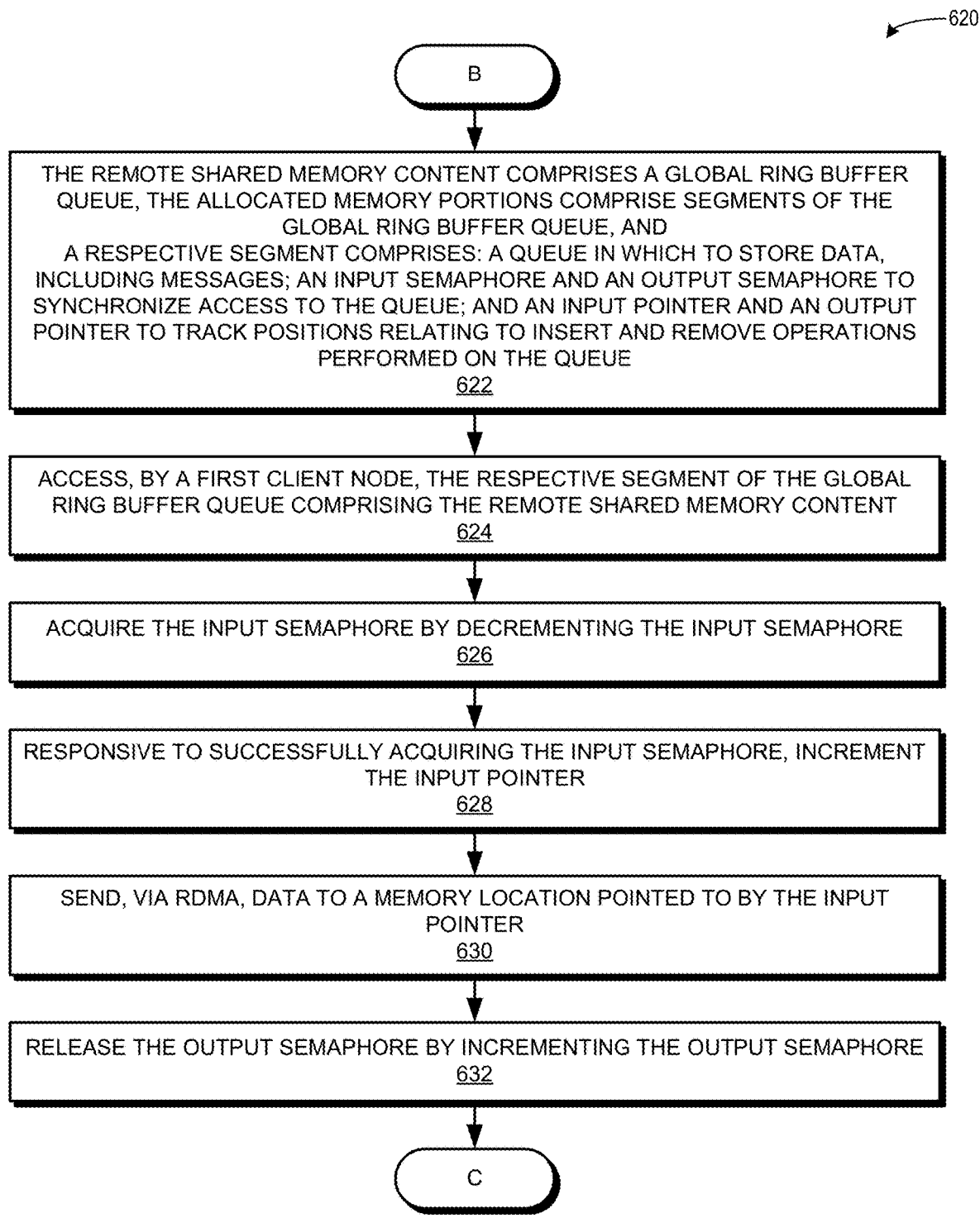
FIG. 6B presents a flowchart illustrating a method which facilitates delivering messages via a shared ring buffer queue using an LFA-based shared memory access in a distributed system, in accordance with an aspect of the present application.

FIG. 6B presents a flowchart 620 illustrating a method which facilitates delivering messages via a shared ring buffer queue using an LFA-based shared memory access in a distributed system, in accordance with an aspect of the present application. The remote shared memory content comprises a global ring buffer queue, the allocated memory portions comprise segments of the global ring buffer queue, and a respective segment comprises: a queue in which to store data, including messages; an input semaphore and an output semaphore to synchronize access to the queue; and an input pointer and an output pointer to track positions relating to insert and remove operations performed on the queue (operation 622). The system accesses, by a first client node, the respective segment of the global ring buffer queue comprising the remote shared memory content (operation 624). The system acquires the input semaphore by decrementing the input semaphore (operation 626). Responsive to successfully acquiring the input semaphore, the system increments the input pointer (operation 628). The system sends, via RDMA, data to a memory location pointed to by the input pointer (operation 630). The system releases the output semaphore by incrementing the output semaphore (operation 632), and the operation continues at Label C of FIG. 6C.

Figure 6C:
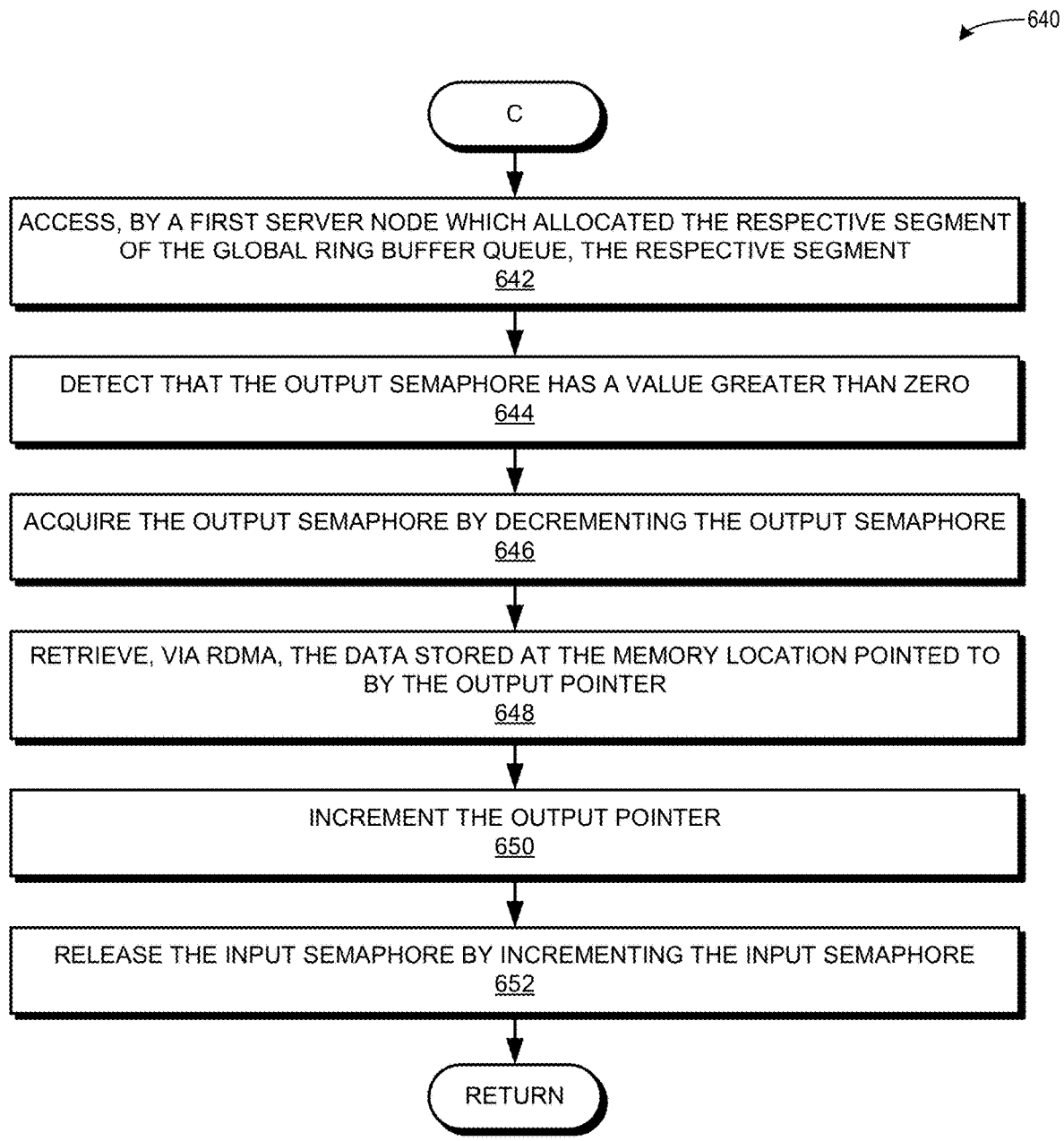
FIG. 6C presents a flowchart illustrating a method which facilitates delivering messages via a shared ring buffer queue using an LFA-based shared memory access in a distributed system, in accordance with an aspect of the present application.

FIG. 6C presents a flowchart 640 illustrating a method which facilitates delivering messages via a shared ring buffer queue using an LFA-based shared memory access in a distributed system, in accordance with an aspect of the present application. The system accesses, by a first server node which allocated the respective segment, the respective segment (operation 642). The system detects that the output semaphore has a value greater than zero (operation 644). The system acquires the output semaphore by decrementing the output semaphore (operation 646). The system retrieves, via RDMA, the data stored at the memory location pointed to by the output pointer (operation 648). The system increments the output pointer (operation 650) and releases the input semaphore by incrementing the input semaphore (operation 652). The operation returns.

Exemplary Computer System and Apparatus

Figure 7:
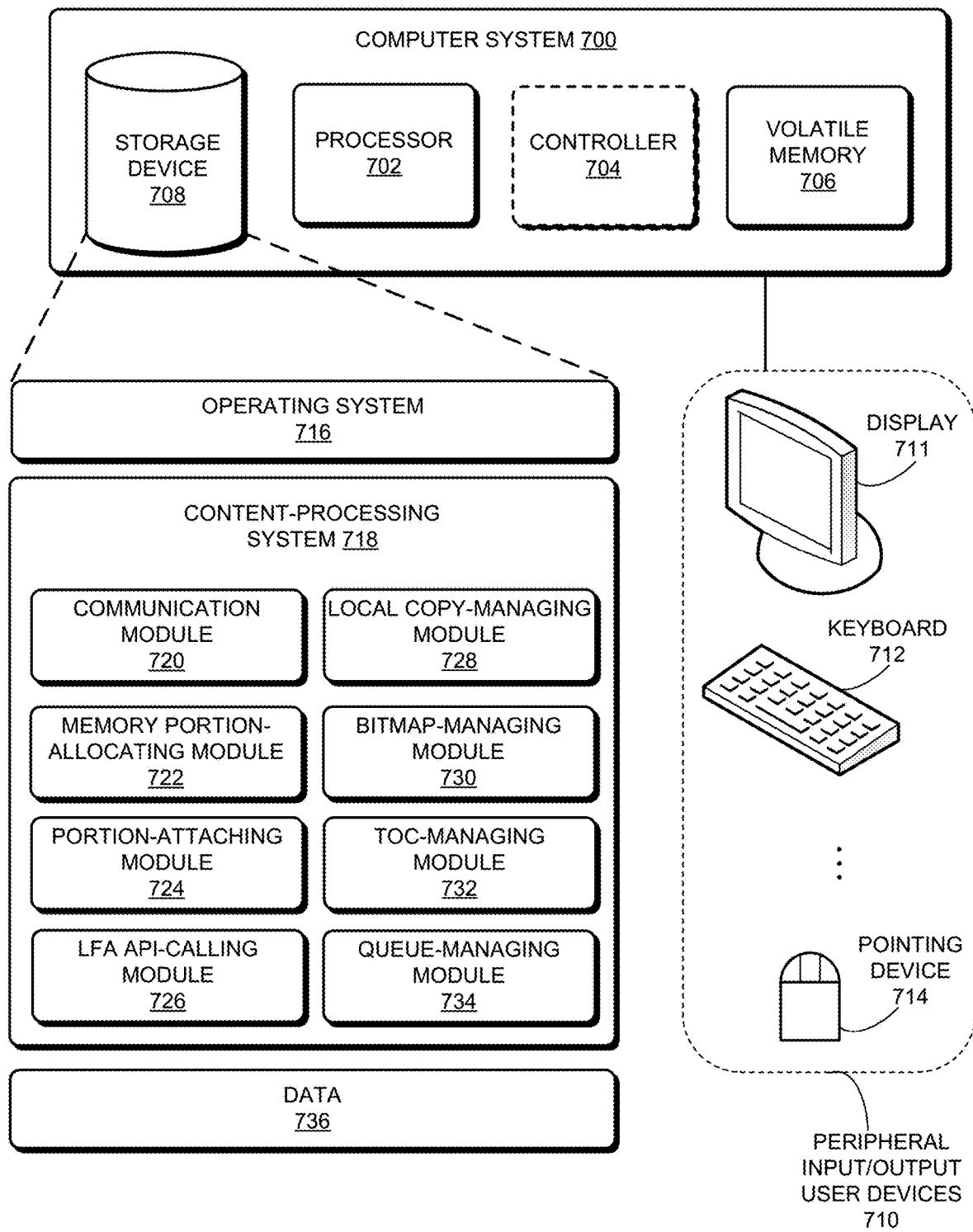
FIG. 7 illustrates an exemplary computer system which facilitates an LFA-based shared memory access, in accordance with an aspect of the present application.

FIG. 7 illustrates an exemplary computer system 700 which facilitates dynamic allocation of space in a distributed filesystem, in accordance with an aspect of the present application. Computer system 700 includes a processor 702, a volatile memory 706, and a storage device 708. In some aspects, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets associated with an LFA API call (communication module 720).

Content-processing system 718 can further include instructions for allocating, in a distributed system comprising a plurality of nodes, a plurality of portions of memory which comprise shared remote memory content (memory portion-allocation module 722). Content-processing system 718 can include instructions for registering the allocated portions with an operating system to be accessed via remote direct memory access (RDMA) (memory portion-allocating module 722). Content-processing system 718 can include instructions for accessing, by a first node, the allocated portions to obtain a local copy of the shared remote memory content (portion-attaching module 724). Content-processing system 718 can also include instructions for performing an atomic operation on one or more bits of the shared remote memory content via libfabric atomic (LFA) application programming interface (API) calls (LFA API-calling module 726).

Content-processing system 718 can additionally include instructions for updating the one or more bits of the shared remote memory content based on a new value and an offset (LFA API-calling module 726 and bitmap-managing module 730). Content-processing system 718 can include instructions for retrieving, from the shared remote memory content based on the offset, a current value of the one or more bits prior to the updating (LFA API-calling module 726 and bitmap-managing module 730). Content-processing system 718 can include instructions for performing an action on the shared remote memory content based on a comparison of the retrieved current value with an expected value in the local copy (LFA API-calling module 726 and bitmap-managing module 730).

Content-processing system 718 can further include instructions for accessing a table of contents for files and one or more counter arrays, as described above in relation to FIG. 6A (TOC-managing module 732). Content-processing system 718 can include instructions for accessing a queue (e.g., a message queue) in a segment of a global ring buffer queue, as described above in relation to FIGS. 6B and 6C (queue-managing module 734).

Data 736 can include any data that is required as input or generated as output by the methods and/or processes described in this disclosure. Specifically, data 736 can store at least: a virtual copy of a global data structure; a local copy of a global data structure; an indicator of a segment, partition, blob, or portion of allocated memory; an indicator or identifier of a node, a server node, or a client node; an LFA API call; an atomic operation; an arithmetic operation; a logical operation; a value; a current value, an expected value, or a new value; one or more bits; a bitmap data structure; an entry; a table of contents; a file identifier; a reference count; an offset; a spinlock; a global ring buffer queue; a queue; a message queue; data; atomic data; encoded or decoded data; laminated data; a status; a word; a shared object; message data; a value for an input pointer, an output pointer, an input semaphore, or an output semaphore; an indicator of a filesystem or other distributed system; an indicator of a FAM module or other NVMe device; an extent bitmap; and an extent map.

Figure 8:
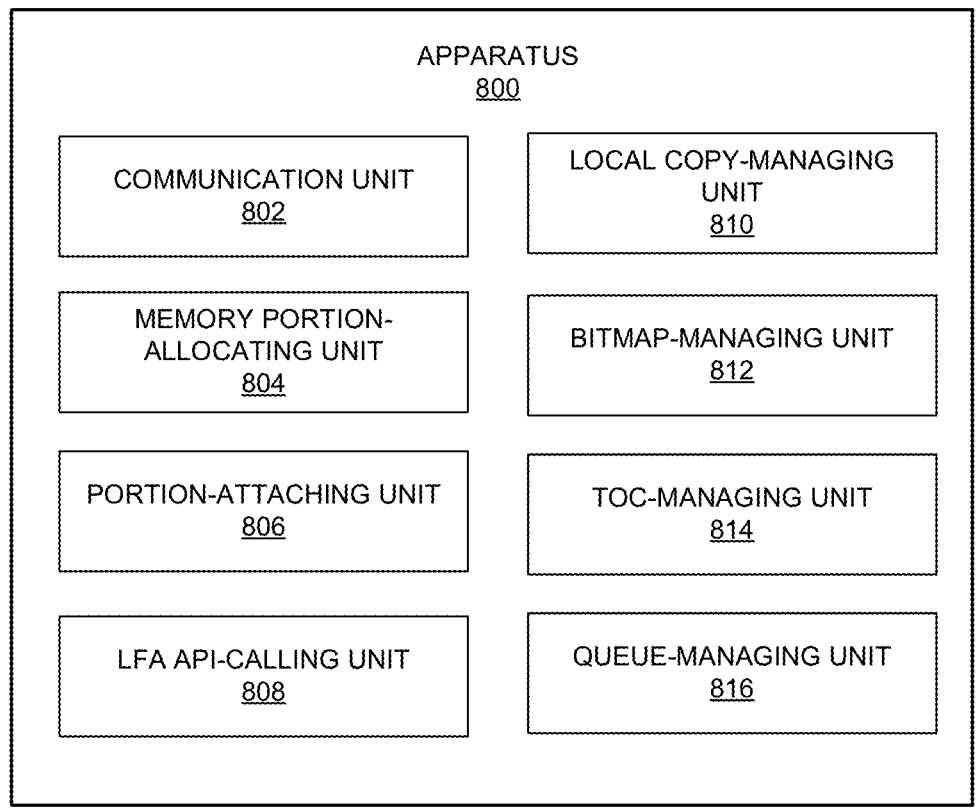
FIG. 8 illustrates an exemplary apparatus which facilitates an LFA-based shared memory access, in accordance with an aspect of the present application.

FIG. 8 illustrates an exemplary apparatus 800 which facilitates dynamic allocation of space in a distributed filesystem, in accordance with an aspect of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 may also include a non-volatile storage system or a memory management unit. Apparatus 800 can comprise modules or units 802-816 which are configured to perform functions or operations similar to modules 720-734 of computer system 700 of FIG. 7, including: a communication unit 802; a memory portion-allocating unit 804; a portion-attaching unit 806; an LFA API-calling unit 808; a local copy-managing unit 810; a bitmap-managing unit 812; a TOC-managing unit 814; and a queue-managing unit 816.

In general, the disclosed aspects provide a system which facilitates an LFA-based lockless cluster-wide shared memory access API in a distributed system. In one aspect, the system allocates, in a distributed system comprising a plurality of nodes, a plurality of portions of memory which comprise shared remote memory content. The system registers the allocated portions with an operating system to be accessed via remote direct memory access (RDMA). The system accesses, by a first node, the allocated portions to obtain a local copy of the shared remote memory content. The system performs an atomic operation on one or more bits of the shared remote memory content via libfabric atomic (LFA) application programming interface (API) calls, which comprises one or more of: updating the one or more bits of the shared remote memory content based on a new value and an offset; retrieving, from the shared remote memory content based on the offset, a current value of the one or more bits prior to the updating; and performing an action on the shared remote memory content based on a comparison of the retrieved current value with an expected value in the local copy.

In a variation on this aspect, the system performs the action on the shared remote memory content by the following operations. Responsive to determining that the current value does not match the expected value, the system receives an error message. Responsive to determining that the current value matches the expected value, the system performs the atomic operation on the one or more bits of the shared remote memory content, wherein the offset comprises a global offset in the shared remote memory content associated with the one or more bits.

In a further variation on this aspect, the system performs the atomic operation on the local copy by updating, in the local copy based on the new value and the offset, a shared object which corresponds to the one or more bits of the shared remote memory content.

In a further variation, the atomic operation comprises one or more of: performing an arithmetic operation on the one or more bits, including one or more of an addition operation and a subtraction operation; and performing a logical bitwise operation on the one or more bits, including one or more of an AND operation, an OR operation, and an exclusive OR (XOR) operation.

In a further variation, the plurality of nodes comprise server nodes and client nodes, the server nodes allocate the plurality of portions of memory, and the first node is a client node or a server node. The client nodes perform the atomic operation by attaching, in a first allocated portion based on the new value and the offset, to a shared object which corresponds to the one or more bits.

In another variation on this aspect, the shared remote memory content is accessed by a filesystem associated with the distributed system, and the filesystem is a fabric attached memory filesystem (FAMfs). The server nodes are I/O nodes in the FAMfs. Allocating the plurality of portions of memory is performed by allocator modules associated with each I/O node in the FAMfs, and the remote shared memory content comprises a bitmap data structure which tracks a status, as used or free, of physical extents in the memory of the FAMfs.

In a further variation, the remote shared memory content comprises a table of contents for files and one or more counter arrays, and the allocated memory portions comprise partitions of the table of contents and the one or more counter arrays. The entries corresponding to the files in the table of contents include: a reference count which indicates a number of processes which currently have a respective file open; and an offset to an element in one of the counter arrays.

In a further variation on this aspect, the system receives a request to open a file with an associated file identifier in the distributed system. The system determines a partition of the table of contents which includes the file identifier. The system obtains a spinlock for the partition of the table of contents. The system searches the partition of the table of contents to obtain an entry corresponding to the file identifier. The entry includes: a first reference count; and a first offset to an element in a first counter array, wherein the element comprises a count of an action associated with the file identifier. Responsive to finding the entry, the system increments the first reference count. The system releases the spinlock for the partition of the table of contents, and accesses the first counter array at the first offset to increment the count of the action.

In another variation on this aspect, the remote shared memory content comprises a global ring buffer queue, and the allocated memory portions comprise segments of the global ring buffer queue. A respective segment comprises: a queue in which to store data, including messages; an input semaphore and an output semaphore to synchronize access to the queue; and an input pointer and an output pointer to track positions relating to insert and remove operations performed on the queue.

In a further variation, the system accesses, by the first client node, the respective segment by performing the following operations. The system acquires the input semaphore by decrementing the input semaphore. Responsive to successfully acquiring the input semaphore, the system increments the input pointer. The system sends, via RDMA, data to a memory location pointed to by the input pointer, and the system releases the output semaphore by incrementing the output semaphore.

In a further variation, the system accesses, by a first server node which allocated the respective segment, the respective segment by performing the following operations. The system detects that the output semaphore has a value greater than zero. The system acquires the output semaphore by decrementing the output semaphore, and retrieves, via RDMA, the data stored at the memory location pointed to by the output pointer. The system increments the output pointer and releases the input semaphore by incrementing the input semaphore The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   allocating, in a distributed system comprising a plurality of nodes, a plurality of portions of memory which comprise shared remote memory content;
   registering the allocated portions with an operating system to be accessed via remote direct memory access (RDMA);
   accessing, by a first node, the allocated portions to obtain a local copy of the shared remote memory content; and
   performing an atomic operation on one or more bits of the shared remote memory content via libfabric atomic (LFA) application programming interface (API) calls, which comprises:
     updating the one or more bits of the shared remote memory content based on a new value and an offset;
     retrieving, from the shared remote memory content based on the offset, a current value of the one or more bits prior to the updating; and
     performing an action on the shared remote memory content based on a comparison of the retrieved current value with an expected value in the local copy;
   wherein the plurality of nodes comprise server nodes and client nodes,
   wherein the server nodes allocate the plurality of portions of memory,
   wherein the first node is a client node or a server node,
   wherein the client nodes perform the atomic operation by attaching, in a first allocated portion based on the new value and the offset, to a shared object which corresponds to the one or more bits;
   wherein the shared remote memory content is accessed by a filesystem associated with the distributed system,
   wherein the filesystem is a fabric attached memory filesystem (FAMfs),
   wherein the server nodes are I/O nodes in the FAMfs,
   wherein allocating the plurality of portions of memory is performed by allocator modules associated with each I/O node in the FAMfs, and
   wherein the remote shared memory content comprises a bitmap data structure which tracks a status, as used or free, of physical extents in the memory of the FAMfs.

2. The method of claim 1, wherein performing the action on the shared remote memory content comprises:
   responsive to determining that the current value does not match the expected value, receiving an error message; and
   wherein the offset comprises a global offset in the shared remote memory content associated with the one or more bits.

3. The method of claim 1, further comprising:
   performing the atomic operation on the local copy by updating, in the local copy based on the new value and the offset, a shared object which corresponds to the one or more bits of the shared remote memory content.

4. The method of claim 1,
   wherein the remote shared memory content comprises a table of contents for files and one or more counter arrays,
   wherein the allocated memory portions comprise partitions of the table of contents and the one or more counter arrays, and
   wherein entries corresponding to the files in the table of contents include:
     a reference count which indicates a number of processes which currently have a respective file open; and
     an offset to an element in one of the counter arrays.

5. The method of claim 4, further comprising:
   receiving a request to open a file with an associated file identifier in the distributed system;
   determining a partition of the table of contents which includes the file identifier;
   obtaining a spinlock for the partition of the table of contents;

searching the partition of the table of contents to obtain an entry corresponding to the file identifier, wherein the entry includes:
  a first reference count; and
  a first offset to an element in a first counter array, wherein the element comprises a count of an action associated with the file identifier;
responsive to finding the entry, incrementing the first reference count; releasing the spinlock for the partition of the table of contents; and
releasing the spinlock for the partition of the table of contents; and
accessing the first counter array at the first offset to increment the count of the action.

6. The method of claim 1,
wherein the remote shared memory content comprises a global ring buffer queue,
wherein the allocated memory portions comprise segments of the global ring buffer queue, and
wherein a respective segment comprises:
  a queue in which to store data, including messages;
  an input semaphore and an output semaphore to synchronize access to the queue; and
  an input pointer and an output pointer to track positions relating to insert and remove operations performed on the queue.

7. The method of claim 6, further comprising accessing, by the first client node, the respective segment by:
acquiring the input semaphore by decrementing the input semaphore;
responsive to successfully acquiring the input semaphore, incrementing the input pointer;
sending, via RDMA, data to a memory location pointed to by the input pointer; and
releasing the output semaphore by incrementing the output semaphore.

8. The method of claim 6, further comprising accessing, by a first server node which allocated the respective segment, the respective segment by:
detecting that the output semaphore has a value greater than zero;
acquiring the output semaphore by decrementing the output semaphore;
retrieving, via RDMA, the data stored at the memory location pointed to by the output pointer;
incrementing the output pointer; and
releasing the input semaphore by incrementing the input semaphore.

9. A computer system, comprising:
a processor; and
a memory coupled to the processor and storing instructions which, when executed by the processor, cause the processor to perform a method, the method comprising:
  allocating, in a distributed system comprising a plurality of nodes, a plurality of portions of memory which comprise shared remote memory content;
  registering the allocated portions with an operating system to be accessed via remote direct memory access (RDMA);
  accessing, by a first node, the allocated portions to obtain a local copy of the shared remote memory content; and
  performing an atomic operation on one or more bits of the shared remote memory content via libfabric atomic (LFA) application programming interface (API) calls, which comprises:
    updating the one or more bits of the shared remote memory content based on a new value and an offset;
    retrieving, from the shared remote memory content based on the offset, a current value of the one or more bits prior to the updating; and
    performing an action on the shared remote memory content based on a comparison of the retrieve current value with an expected value in the local copy;
wherein the plurality of nodes comprise server nodes and client nodes,
wherein the server nodes allocate the plurality of portions of memory,
wherein the first node is a client node or a server node,
wherein the client nodes perform the atomic operation by attaching, in a first allocated portion based on the new value and the offset, to a shared object which corresponds to the one or more bits;
wherein the shared remote memory content is accessed by a filesystem associated with the distributed system,
wherein the filesystem is a fabric attached memory filesystem (FAMfs),
wherein the server nodes are I/O nodes in the FAMfs,
wherein allocating the plurality of portions of memory is performed by allocator modules associated with each I/O node in the FAMfs, and
wherein the remote shared memory content comprises a bitmap data structure which tracks a status, as used or free, of physical extents in the memory of the FAMfs.

10. The computer system of claim 9, wherein performing the action on the shared remote memory content comprises:
responsive to determining that the current value does not match the expected value, receiving an error message; and
responsive to determining that the current value matches the expected value, performing the atomic operation on the one or more bits of the shared remote memory content,
wherein the offset comprises a global offset in the shared remote memory content associated with the one or more bits.

11. The computer system of claim 9, wherein the method further comprises:
performing the atomic operation on the local copy by updating, in the local copy based on the new value and the offset, a shared object which corresponds to the one or more bits of the shared remote memory content.

12. The computer system of claim 9,
wherein the remote shared memory content comprises a table of contents for files and one or more counter arrays,
wherein the allocated memory portions comprise partitions of the table of contents and the one or more counter arrays, and
wherein entries corresponding to the files in the table of contents include:
  a reference count which indicates a number of processes which currently have a respective file open; and
  an offset to an element in one of the counter arrays.

13. The computer system of claim 12, wherein the method further comprises:
receiving a request to open a file with an associated file identifier in the distributed system;
determining a partition of the table of contents which includes the file identifier;

obtaining a spinlock for the partition of the table of contents;
searching the partition of the table of contents to obtain an entry corresponding to the file identifier, wherein the entry includes:
 a first reference count; and
 a first offset to an element in a first counter array, wherein the element comprises a count of an action associated with the file identifier;
responsive to finding the entry, incrementing the first reference count;
releasing the spinlock for the partition of the table of contents; and
accessing the first counter array at the first offset to increment the count of the action.

14. The computer system of claim 9,
wherein the remote shared memory content comprises a global ring buffer queue,
wherein the allocated memory portions comprise segments of the global ring buffer queue, and
wherein a respective segment comprises:
 a queue in which to store data, including messages;
 an input semaphore and an output semaphore to synchronize access to the queue; and
 an input pointer and an output pointer to track positions relating to insert and remove operations performed on the queue.

15. The computer system of claim 14, wherein the method further comprises accessing, by the first client node, the respective segment by:
acquiring the input semaphore by decrementing the input semaphore;
responsive to successfully acquiring the input semaphore, incrementing the input pointer;
sending, via RDMA, data to a memory location pointed to by the input pointer; and
releasing the output semaphore by incrementing the output semaphore.

16. A non-transitory computer-readable storage medium storing instructions that when executed by a computer cause the computer to perform a method, the method comprising:
allocating, in a distributed system comprising a plurality of nodes, a plurality of portions of memory which comprise shared remote memory content;
registering the allocated portions with an operating system to be accessed via remote direct memory access (RDMA);
accessing, by a first node, the allocated portions to obtain a local copy of the shared remote memory content; and
performing an atomic operation on one or more bits of the shared remote memory content via libfabric atomic (LFA) application programming interface (API) calls, which comprises:
 updating the one or more bits of the shared remote memory content based on a new value and an offset;
 retrieving, from the shared remote memory content based on the offset, a current value of the one or more bits prior to the updating; and
 performing an action on the shared remote memory content based on a comparison of the retrieved current value with an expected value on the local copy;
wherein the plurality of nodes comprise server nodes and client nodes,
wherein the server nodes allocate the plurality of portions of memory,
wherein the first node is a client node or a server node,
wherein the client nodes perform the atomic operation by attaching, in a first allocated portion based on the new value and the offset, to a shared object which corresponds to the one or more bits;
wherein the shared remote memory content is accessed by a filesystem associated with the distributed system,
wherein the filesystem is a fabric attached memory filesystem (FAMfs),
wherein the server nodes are I/O nodes in the FAMfs,
wherein allocating the plurality of portions of memory is performed by allocator modules associated with each I/O node in the FAMfs, and
wherein the remote shared memory content comprises a bitmap data structure which tracks a status, as used or free, of physical extents in the memory of the FAMfs.

17. The non-transitory computer-readable storage medium of claim 16,
wherein the remote shared memory content comprises a global ring buffer queue,
wherein the allocated memory portions comprise segments of the global ring buffer queue, and
wherein a respective segment comprises:
 a queue in which to store data, including messages;
 an input semaphore and an output semaphore to synchronize access to the queue; and
 an input pointer and an output pointer to track positions relating to insert and remove operations performed on the queue.

18. The non-transitory computer-readable storage medium of claim 17, further comprising accessing, by the first client node, the respective segment by:
acquiring the input semaphore by decrementing the input semaphore;
responsive to successfully acquiring the input semaphore, incrementing the input pointer;
sending, via RDMA, data to a memory location pointed to by the input pointer; and
releasing the output semaphore by incrementing the output semaphore.

19. The non-transitory computer-readable storage medium of claim 17, further comprising accessing, by a first server node which allocated the respective segment, the respective segment by:
detecting that the output semaphore has a value greater than zero;
acquiring the output semaphore by decrementing the output semaphore;
retrieving, via RDMA, the data stored at the memory location pointed to by the output pointer;
incrementing the output pointer; and
releasing the input semaphore by incrementing the input semaphore.

* * * * *